United States Patent

Kira et al.

[11] 4,413,476
[45] Nov. 8, 1983

[54] GEOGRAPHICALLY POSITIONED, ENVIRONMENTAL, SOLAR HUMIDIFICATION ENERGY CONVERSION

[76] Inventors: Gene S. Kira, 7986 Amargosa Dr., Carlsbad, Calif. 92008; Jens O. Sorensen, P.O. Box 2274, Rancho Sante Fe, Calif. 92067

[21] Appl. No.: 220,175

[22] Filed: Dec. 23, 1980

[51] Int. Cl.³ ............................................. F03G 7/02
[52] U.S. Cl. ................... 60/641.8; 60/641.9; 126/433; 165/104.13; 165/104.34
[58] Field of Search ............... 60/641.8, 643, 645, 60/641.9, 648; 126/428, 429, 433, 434, 449; 165/104.13, 104.34

[56] References Cited

U.S. PATENT DOCUMENTS 984,585 2/1911 McHenry ........................... 60/641.8

FOREIGN PATENT DOCUMENTS 55-43266 3/1980 Japan ................................. 60/641.8

*Primary Examiner*—Allen M. Ostrager
*Assistant Examiner*—Stephen F. Husar

[57] ABSTRACT

A system and a method of geographically positioned, environmental solar humidification energy conversion is disclosed. The method includes the steps of:
(a) providing air in a solar collector;
(b) providing water in the solar collector;
(c) combining the provided air with the provided water in the solar collector to create humid air;
(d) heating the provided air, the provided water and/or the humid air by the solar collector to create warm humid air;
(e) transporting the warm humid air to a boiler of a closed cycle power system;
(f) providing a working fluid in the boiler of the power system;
(g) heating the working fluid in the boiler with the transported warm humid air whereby the working fluid is pressurized and the warm humid air is cooled, whereby some water vapor condenses;
(h) converting the energy of the pressurized working fluid by passing the fluid through a turbine to produce a useful form of energy, thereby expanding the working fluid;
(i) transporting the expanded working fluid to a condenser of the closed cycle power system;
(j) introducing waste water from an environmental body of water;
(k) transporting the waste water to the condenser of the power system;
(l) cooling the transported expanded working fluid in the condenser with the transported waste water, whereby the working fluid condenses, thereby heating the waste water;
(m) recycling the cooled working fluid to provide said working fluid in the boiler of the power system.

16 Claims, 4 Drawing Figures

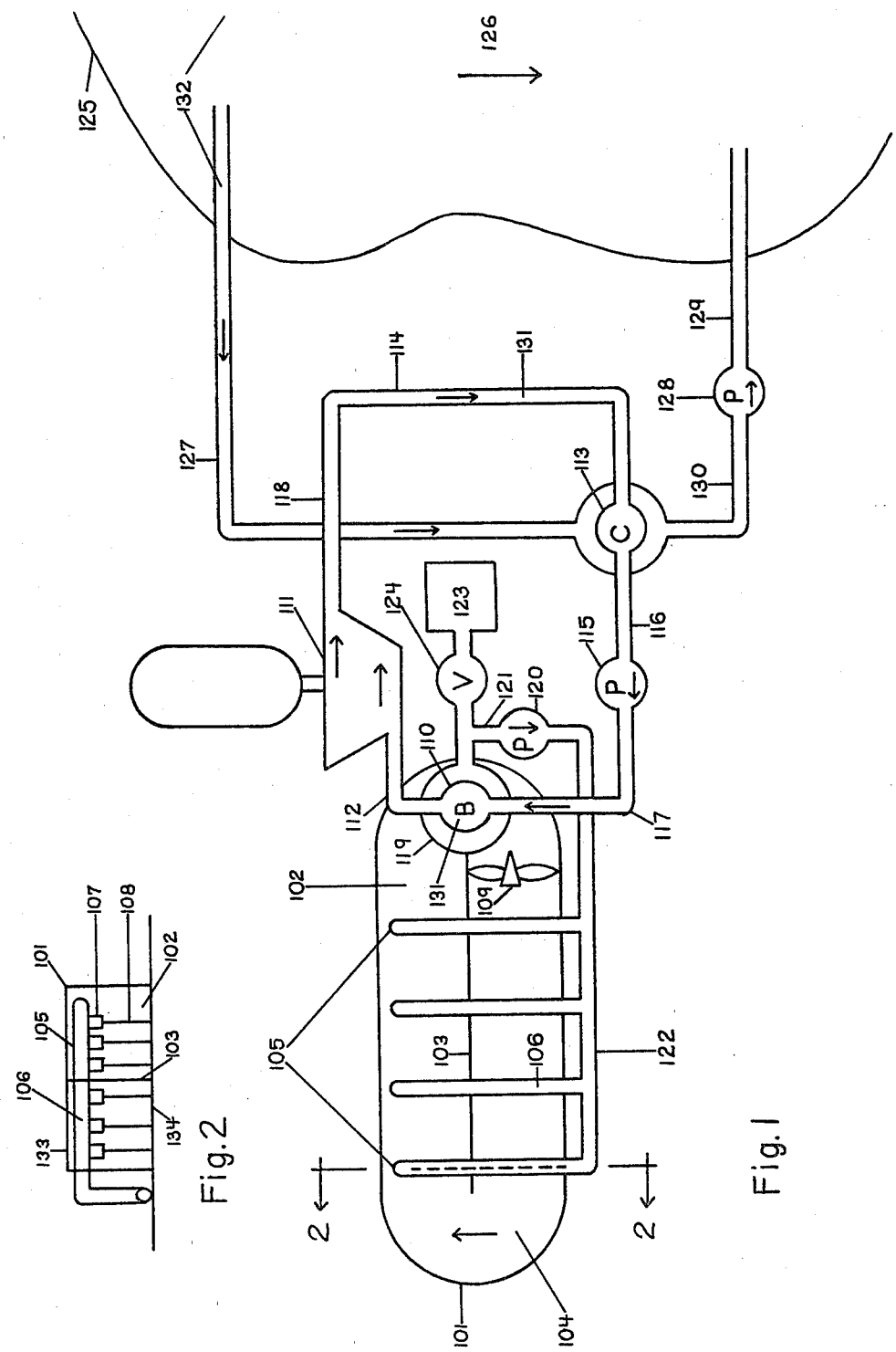

GEOGRAPHICALLY POSITIONED, ENVIRONMENTAL, SOLAR HUMIDIFICATION ENERGY CONVERSION

FIELD OF THE INVENTION

The invention generally pertains to solar energy conversion and is particularly directed to large environmentally positioned systems, utilizing the natural geographical resources available.

CROSS REFERENCE TO RELATED APPLICATION

This application is cross referenced to a related co-pending application Ser. No. 156,274 filed on June 4, 1980 for Energy Conversion Derived From Temperature Differentials at Different Elevations, by the same coinventors.

DISCUSSION OF PRIOR ART

Examples of prior art in the same field of invention are described in U.S. Pat. No. 3,436,908 to Van Delic for Solar Air Moving System, U.S. Pat. No. 3,894,393 to Carlson for Power Generation Through Controlled Convection, U.S. Pat. No. 3,936,652 to Levine for Power System, U.S. Pat. No. 3,945,218 to Parker for Environment Control System, U.S. Pat. No. 4,106,295 to Wood for Air Pressure Differential Energy System, and U.S. Pat. No. 4,143,516 to Long for Air-Water Power Generator.

The principle of the above Patents to Carlson, Levine, Wood and Long all employ moist air or the air itself as the working fluid in the power system. The principle of the Patent to Van Delic employs no power system at all, and the principle of the Patent to Parked does not combine air with water nor employ a lake for cooling purposes.

None of the above mentioned patented systems employs a heat transfer of warm moist air to a working fluid; it should be mentioned that warm moist air has a very large internal heat energy content in relation to warm dry air.

OBJECTS OF THE INVENTION

Every year it is becoming increasingly more evident that man is quickly using up his supply of non-renewable fuels, and that the use of these non-renewable fuels progressively pollutes his environment; the last remaining non-renewable fuels seem to be the most polluting. Therefore, it is of urgent importance that cost efficient systems and methods of energy conversion from renewable sources be put to use in the near future, especially since large untraditional mechanisms often take many years for their implementation.

It is, therefore, the object of this invention to disclose a cost efficient system and method of renewable energy conversion, which is non-polluting to the environment, and which can be implemented in a foreseeable future because it uses components the technology of which chiefly exists.

It is also an object of this invention to disclose a system and method enabling the productive use of vast, arid desert areas which at present do not contribute to the economy of man.

It is also an object of this invention to disclose a system of fresh water production.

It is also an object of this invention to disclose a system and method of salt production.

The system is environmentally and geographically dependent, since necessary conditions include a body of cooling water, abundant sunshine and a large, topographically suitable area for the gas-filled solar collector.

SUMMARY OF THE INVENTION

The present invention discloses a system and a method of geographically positioned, environmental solar humidification energy conversion. The method includes the steps of:

(a) providing air in a solar collector;
(b) providing water in the solar collector;
(c) combining the provided air with the provided water in the solar collector to create humid air;
(d) heating the provided air, the provided water and/or the humid air by the solar collector to create warm humid air;
(e) transporting the warm humid air to a boiler of a closed cycle power system;
(f) providing a working fluid in the boiler of the power system;
(g) heating the working fluid in the boiler with the transported warm humid air whereby the working fluid is pressurized and the warm humid air is cooled, whereby some water vapor condenses;
(h) converting the energy of the pressurized working fluid by passing the fluid through a turbine to produce a useful form of energy, thereby expanding the working fluid;
(i) transporting the expanded working fluid to a condenser of the closed cycle power system;
(j) introducing waste water from an environmental body of water;
(k) transporting the waste water to the condenser of the power system;
(l) cooling the transported expanded working fluid in the condenser with the transported waste water, whereby the working fluid condenses, thereby heating the waste water;
(m) recycling the cooled working fluid to provide said working fluid in the boiler of the power system.

BRIEF DESCRIPTION OF THE DRAWINGS

FIGS. 1 to 4 are schematic diagrams of three alternative preferred embodiments of Geographically Positioned, Environmental, Solar Humidification Energy Conversion Systems according to the present invention.

FIG. 1 is an aerial view of the first preferred embodiment where the "up" direction is perpendicular to the plane of the drawing sheet and in a direction toward the viewer. FIG. 2 is a sectional view of the first preferred embodiment taken through a plane indicated by section line 2—2 in FIG. 1.

FIGS. 3 and 4 are cross-sectional views of the second and third preferred embodiments respectively where the up direction is toward the right hand side of the drawing sheet.

DESCRIPTION OF THE PREFERRED EMBODIMENTS

Figure 3:
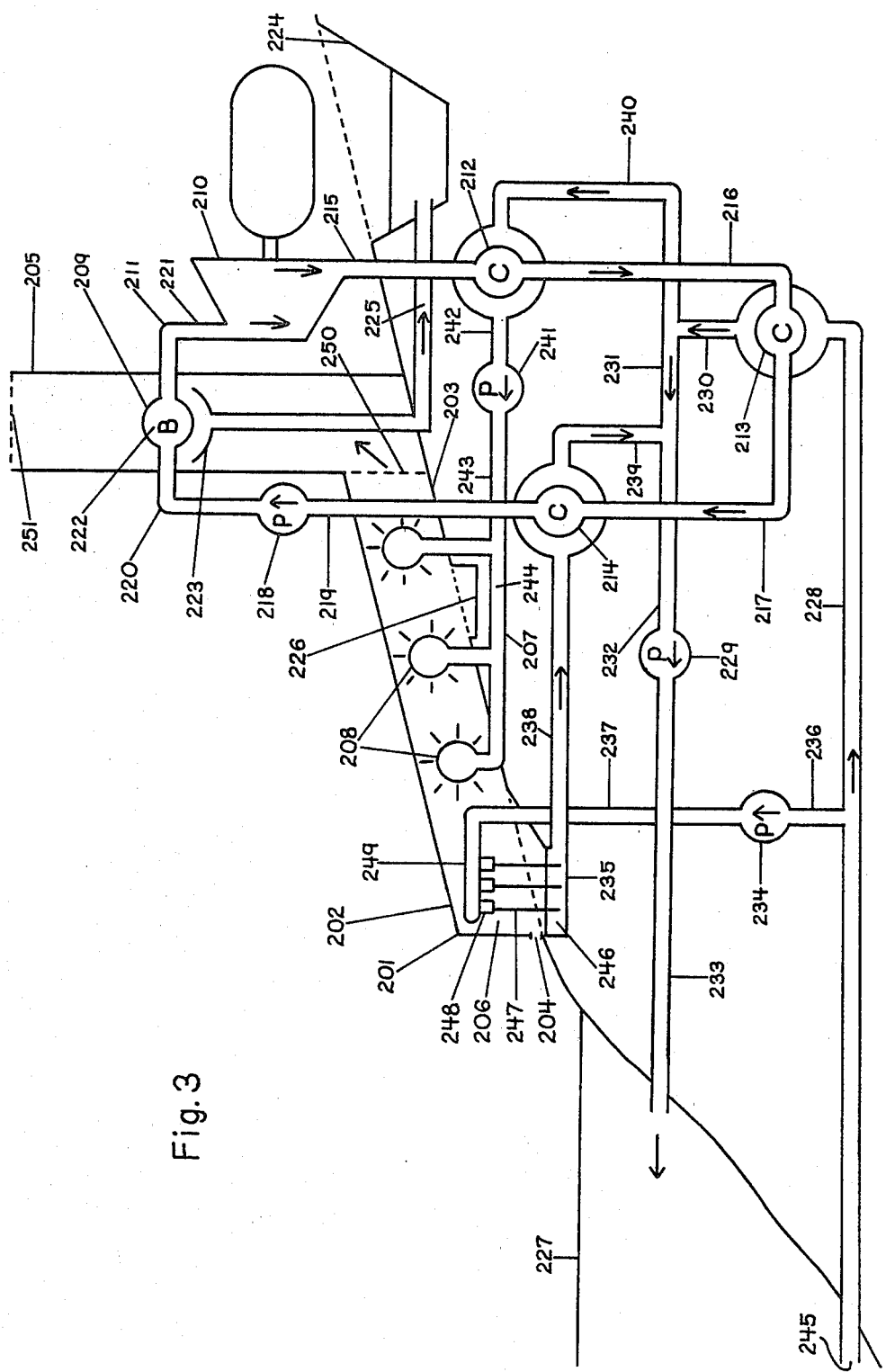

The system illustrated in FIGS. 1 and 2 includes:

A solar collector 101, containing air 102, with a transparent roof 133, and a black floor 134. A central partition 103 in the solar collector 101 which creates a closed circulatory air passage 104. A network of conduits 105 for distributing water 106, in the solar collector 101. An array of emitters 107, similar in type to those used for agricultural irrigation, is attached to the network of conduits 105.

Absorbent filaments 108, with a large surface area such as knitting yarn; each filament 108 is suspended in the air 102 down from an emitter 107, so that the lower end of the filament 108 contacts the floor 134.

A high volume, low pressure differential gas pump 109 positioned across the closed circulatory air passage 104 in the solar collector 101. A boiler 110 positioned in the solar collector.

A turbine generator 111 connected by a conduit 112 to the boiler 110.

A condenser 113 connected by a conduit 114 to the turbine 111.

A pump 115 connected by a conduit 116 to the condenser 113 and by a conduit 117 to the boiler 110.

The boiler 110, turbine generator 111, condenser 113, pump 115, and the four conduits 112, 114, 116 and 117 make up a closed cycle power system 118 containing a working fluid 131 such as ammonia.

A condensed water collector 119 positioned under the boiler 110.

A pump 120 connected by a conduit 121 to the condensed water collector 119 and connected by a conduit 122 to the network of conduits 105.

An additive supplier 123 is connected through a valve 124 to the conduit 121 which connects the condensed water collector 119 with the pump 120. A lake 125 containing waste water 132 with a natural current 126. A supply conduit 127 connects the upstream portion of the lake 125 with the condenser 113.

A pump 128 connected by a conduit 129 to the downstream portion of the lake 125 and connected by a conduit 130 to the condenser 113.

The operation of the system illustrated in FIGS. 1 and 2 is as follows:

Air 102 is provided in the solar collector 101. Water 106 is provided in the network of conduits 105 in a manner to be described later. The provided water 106 is distributed through the network of conduits 105 to the array of emitters 107. The distributed water is drip or trickle emitted by the emitters 107 whereby the emitted water travels down the absorbent filaments 108 where each filament 108 is connected to an emitter 107 and where each filament 108 is suspended in the air 102 from the emitter 107 to which it is connected so that the lower end of the filament 108 contacts the floor 134. The emitted water is absorbed by the filaments 108, and moisture from the floor 134 is also absorbed by the filaments 108 so that the filaments 108 behave like wicks.

The absorbed water is evaporated from the filaments 108 thereby combining the provided air 102 with the provided water 106 in the solar collector 101 to create humid air.

The solar collector 101 heats the provided air 102 and the humid air by solar radiation and also heats the provided water 106 in the network of conduits 105 by solar radiation on the network of conduits 105 which is black in color, resulting in the creation of warm humid air. The gas pump 109 circulates the air around in the closed circulatory air passage 104 whereby air constantly is provided in the air passage 104 and whereby warm humid air is transported to the boiler 110. A working fluid 131 is provided in the boiler 110 of the power system 118 in a manner later described. The working fluid in the boiler 110 is brought into heat exchange relationship with the circulated warm humid air whereby the working fluid 131 is heated causing it to become pressurized, at the same time as the warm humid air is cooled and some water vapor condenses. The pressurized working fluid 131 is conducted from the boiler 110 through conduit 112 to the turbine generator 111 to produce electric power, whereby the working fluid is expanded.

The expanded working fluid 131 is conducted through conduit 114 to a condenser 113 of the closed cycle power system 118.

Cool waste water 132 is pumped from the lake 125 via the conduit 127, via the condenser 113 and via conduit 130 by the pump 128, and is discarded back into the lake 125 at a location which is downstream of the supply conduit 127 so that the natural current 126 prevents the discarded water from getting mixed with the cool water which is inducted into the supply conduit 127, whereby the conducted expanded working fluid is brought in heat exchange relationship with the waste water, whereby the working fluid cools and condenses, and the waste water is heated. The cooled working fluid is recirculated by pump 115 from the condenser 113 via conduits 116 and 117 to the boiler 110 thereby providing the working fluid 131 in the boiler 110.

The condensed water vapor falls into the condensed water collector 119 and is pumped by pump 120 via conduits 121 and 122 to the network of conduits 105 whereby the condensed water vapor is collected and recycled to the network of conduits 105. Periodically the condensed water is treated with a surfactant such as a detergent and a dye by opening valve 124, thereby adding the surfactant and dyes from additive supplier 123. The surfactant aids the evaporation process and the dye is black, which keeps the filaments 108 in a dark color for absorption of solar radiation.

The system in FIG. 3 includes a solar collector 201 containing air 206 with a transparent roof 202 and a floor 203 and an air intake orifice 204. A stack 205 with an air intake orifice 250 at the bottom end and an air exhaust orifice 251 at the top end is connected to the solar collector 201 at the air intake orifice 250 of the stack 205.

A network of conduits 207 for distributing water 244 in the solar collector 201 and an array of sprinklers 208 attached to the network of conduits 207. A boiler 209 is positioned at medium height in the stack 205.

A turbine generator 210 is connected to the boiler 209 by a conduit 211. A condenser system consisting of three condensers, a first condenser 212, a second condenser 213 and a third condenser 214. The first condenser 212 is connected to the turbine generator 210 by conduit 215. The second condenser 213 is connected to the first condenser 212 by conduit 216. The third condenser 214 is connected to the second condenser 213 by conduit 217. A pump 218 is connected to the third condenser 214 by conduit 219 and connected to the boiler 209 by conduit 220. The boiler 209, the turbine generator 210, the three condensers 212, 213, and 214, the pump 218 and the six connecting conduits 211, 215, 216, 217, 219 and 220 make up a closed cycle power system 221 containing a working fluid 222 such as ammonia. A condensed water collector 223 is positioned under the boiler 209. A fresh water reservoir 224 is connected to the condensed water collector 223 by conduit 225. An evaporative salt collector 226 is positioned at the floor 203 of the solar collector 201.

The second condenser 213 is connected to a low elevation in an ocean 227 of waste water 245 by conduit 228.

A pump 229 is connected to the second condenser 213 by the series of conduits 230, 231 and 232, and further connected to a higher elevation in the ocean 227 by conduit 233. A pump 234 is connected to conduit 228 by conduit 236. A system of conduits 249 for distributing water in the solar collector 201 is connected to conduit 237 which is connected to pump 234. An array of emitters 248, similar to those used for agricultural irrigation is attached to the system of conduits 249.

Absorbent filaments 247, with a large surface area such as knitting yarn; each filament 247 is suspended in the air 206 down from an emitter 248.

A cooling pond 235 with water 246 is positioned directly under the filaments 247. The cooling pond 235 is connected to the third condenser 214 by conduit 238. A conduit 239 connects the third condenser 214 to the junction between conduits 231 and 232. A conduit 240 connects the first condenser 212 to the junction between conduits 230 and 231.

A pump 241 is connected to the first condenser 212 by conduit 242 and is further connected to the network of conduits 207 by conduit 243. The second condenser 213 is positioned at an elevation which is below the elevation of the surface of the ocean 227.

The operation of the system illustrated in FIG. 3 is as follows:

Air 206 is provided in the solar collector 201 via the intake orifice 204. Warm water 244 is provided in the solar collector 201 through the network of conduits 207 leading to an array of sprinklers 208 which inject a mist of fine water particles into the air, whereby humid air is created in the solar collector 201.

The humid air is heated by the solar collector 201, thereby creating warm humid air which is transported via the solar collector 201 and the lower end of the stack 205 to the boiler 209 in a manner to be described later.

A working fluid 222 is provided in the boiler 209. The working fluid 222 is brought into heat exchange relationship with the warm humid air whereby the working fluid 222 is pressurized and the warm humid air is cooled and some water vapor condenses. The pressurized working fluid is passed through a turbine generator 210 in order to produce electricity, thereby expanding the working fluid. The expanded working fluid is conducted through the series of three condensers, 212, 213, and 214, via the three conduits 215, 216, and 217 respectively.

Waste water 245 is pumped from a low elevation in the ocean 227 via conduit 228 to the second condenser 213, thereby cooling the expanded working fluid in the second condenser 213 with the waste water, whereby some of the working fluid condenses and the waste water becomes heated. Since the ocean water is pumped to the second condenser 213 which is positioned below the ocean surface, power for pumping is reduced. The working fluid which has been cooled by passing through the series of the three condensers 212, 213, and 214, is pumped by pump 218 from the third condenser 214 via conduits 219 and 220 to the boiler 209, thereby recycling the cooled working fluid to provide the working fluid 222 in the boiler 209.

The condensed water falls into the condensate collector 223 and flows by gravity via the conduit 225 to the fresh water reservoir 224.

Pump 234 pumps a second portion of waste water from the ocean 227 via conduits 228, 236 and 237 to the system of conduits 249, which distribute the second portion of waste water to an array of emitters 248 which drip or trickle emit the distributed water whereby the emitted water travels down the absorbent filaments 247, where each filament 247 is connected to an emitter 248, and where each filament 247 is suspended in the air from the emitter 248 to which it is connected. The emitted water is absorbed by the filaments 247 and environmental air 206 is introduced through the intake orifice 204 and passes by the waterfilled filaments 247 thereby evaporating a fraction of the second portion of waste water, whereby the water in the filaments 247 is cooled. The cooled water in the filaments 247 is drip or trickle emitted from the lower end of the filaments 247 whereby the water in the cooling pond 235 is cooled, thereby creating a cooled liquid fraction of water 246 in the cooling pond 235 and an evaporated fraction of water in the solar collector 201, thereby creating more humid air. The environmental air 206 which is introduced through the intake orifice 204 also passes over the surface of the cooling pond 235, thereby evaporating another fraction of the cooled liquid fraction of water in the cooling pond 235 whereby the water in the cooling pond 235 is further cooled.

The cooled liquid fraction of water is transported by gravity from the cooling pond 235 via conduit 238 to the third condenser 214 and brought in heat exchange relationship with the working fluid which is conducted through the third condenser 214, thereby further cooling and condensing the working fluid before it is pumped to the boiler 209, thereby heating the cooled liquid fraction of water which is pumped by pump 229 via conduits 239, 232 and 233 and then discarded at the higher elevation in the ocean 227.

Except for a fraction of heated waste water from the second condenser 213 is pumped by pump 229 via conduits 230, 231, 232 and 233 to be discarded into the ocean at the higher elevation in the ocean 227. The fraction of the heated waste water from the second condenser 213 is pumped by pump 241 via conduit 240, the first condenser 212 and conduits 242 and 243 to the network of conduits 207. As the fraction of heated water passes via the first condenser, 212, it is brought in heat exchange relationship with the working fluid passing through the condenser 212 thereby cooling the working fluid whereby some of the working fluid condenses and also further heating the fraction of heated water, in order to provide the warm water 244.

The water which is injected by the sprinklers 208 is salt water from the ocean 227, in this embodiment. Concentrated salt water settles to the floor 203 of the solar collector 201 where the water is heated and evaporated, leaving salt behind in the evaporative salt collector 226.

The boiler 209 is positioned at an elevation which is higher than the elevation of the air intake orifice 204 of the solar collector 201 which is positioned at the low elevation end of the solar collector 201. The low density of the warm humid air positioned in the solar collector 201 and the lower part of the stack 205 between the intake orifice 204 and the boiler 209 causes the warm humid air to flow from the solar collector 201 upwards to the boiler 209 thereby inducing a flow of the warm humid air to the boiler 209.

The boiler 209 is also positioned at an elevation which is lower than the elevation of the exhaust orifice 251 of the rising conduit 205. The cooled humid air which is cooled by the boiler 209 and positioned between the boiler 209 and the exhaust orifice 251 has a higher temperature and a higher humidity and therefore a lower density than the density of the ambient air outside the rising conduit 205, thereby causing the cooled humid air to flow from the boiler 209 upwards to the exhaust orifice 251 of the rising conduit 205. Because the intake orifice 250 of the rising conduit 205 is connected to the solar collector 201, the upwards flow in the rising conduit 205 further causes the humid warm air to flow to the boiler 209.

Figure 4:
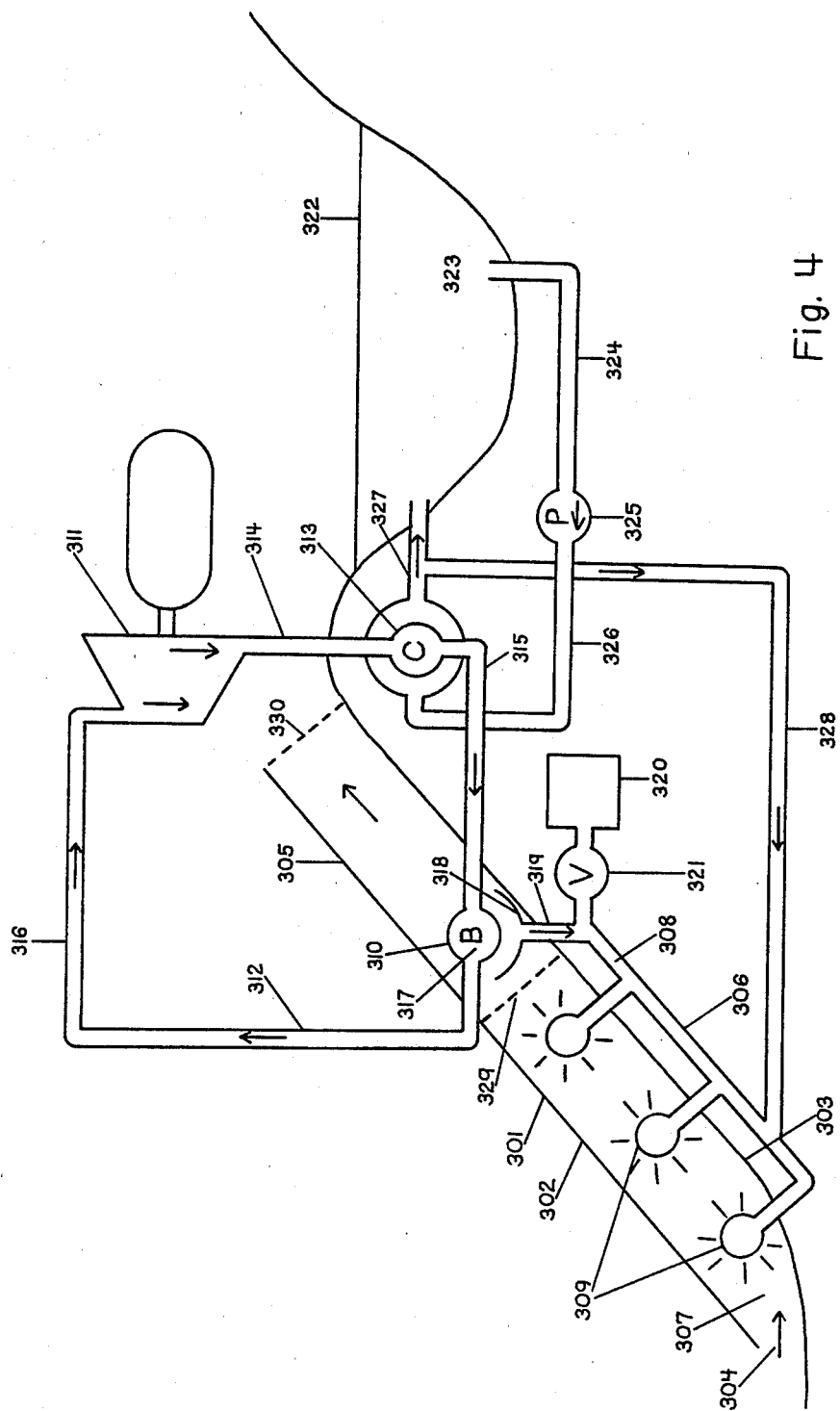

The system in FIG. 4 includes a solar collector 301 containing air 307 with a transparent roof 302 and a black floor 303 and an air intake orifice 304. A rising conduit 305 with an air intake orifice 329 at the bottom end and an air exhaust orifice 330 at the top end is connected to the solar collector 301 at the intake orifice 329. A network of conduits 306 for distributing water 308 in the solar collector 301. An array of sprinklers 309 is attached to the network of conduits 306. A boiler 310 is positioned near where the rising conduit 305 is connected to the solar collector 301.

A turbine generator 311 is connected to the boiler 310 by a conduit 312. A condenser 313 is connected to the turbine generator 311 by a conduit 314 and also connected to the boiler 310 by a conduit 315. The boiler 310, the turbine generator 311 and the condenser 313 and their interconnecting conduits 312, 314, and 315 make up a closed cycle power system 316 containing a working fluid 317, such as ammonia. A condensed water collector 318 is positioned under the boiler 310 and connected by conduit 319 to the network of conduits 306.

An additive supplier 320 is connected through a valve 321 to the conduit 319 which connects the condensed water collector 318 with the network of conduits 306. An elevated lake 322 containing waste water 323.

A supply conduit 324 connects a low elevation in the lake 322 with a pump 325. A conduit 326 connects the pump 325 with the condenser 313 and a conduit 327 connects the condenser 313 with a higher elevation in the lake 322. A conduit 328 connects the conduit 327 with the network of conduits 306. The operation of the system illustrated in FIG. 4 is as follows:

Air 302 is provided in the solar collector 301 via the intake orifice 304. Warm water is provided in the solar collector 301 via conduits 328 and 319 in a manner to be described later, and conducted via the network of conduits 306 leading to the array of sprinklers 309 which inject a mist of fine water particles into the air 307 whereby humid air is created in the solar collector 301. The humid air is heated by the solar collector 301 thereby creating warm humid air which is transported via the solar collector 301 to the boiler 310 in a manner to be described later. A working fluid 317 is provided in the boiler 310. The working fluid 317 is brought into heat exchange relationship with the warm humid air whereby the working fluid 317 is pressurized and the warm humid air is cooled and some water vapor condenses. The pressurized working fluid passes via conduit 312 to a turbine generator 311 in order to produce electricity, thereby expanding the working fluid. The expanded working fluid is conducted to the condenser 313 via conduit 314. Waste water 323 is pumped by a pump 325 from a low elevation in the elevated lake 322 via the conduit 324 and 326 to the condenser 313, thereby cooling the expanded working fluid in the condenser 313 with the waste water, whereby the working fluid condenses and the waste water is heated and then discarded via conduit 327. Since the waste water is pumped to the condenser 313 which is positioned below the surface of the lake, power for pumping is reduced.

The working fluid has been cooled and condensed by passing through the condenser 313 and is conducted by gravity from the condenser 313 via conduit 315 to the boiler 310 which is positioned at a lower elevation than the condenser 313, thereby recycling the cooled working fluid to provide the working fluid 317 in the boiler 310. Since the working fluid is conducted by gravity the energy consumption needed to transport the working fluid from the condenser 313 to the boiler 310 is reduced to zero. The warm condensed water falls into the condensate collector 318 and flows by gravity via the conduit 319 to the network of conduits 306 thereby providing warm water 308 in the network of conduits 306.

The condensed water is treated with a surfactant such as a detergent and a dye by opening valve 321, thereby adding the surfactant and dye from additive supplier 320. The surfactant aids evaporation and the dye is black, which keeps the floor 303 in a dark color for absorbing solar radiation.

A fraction of the waste water which is heated by the condenser 313 and discarded via conduit 327 is fed by gravity via conduit 328 to the network of conduits 306 thereby providing warm water 308 in the network of conduits 306.

The boiler 310 is positioned at an elevation which is higher than the elevation of the air intake orifice 304 which is positioned at the low elevation end of the solar collector 301. The low density of the warm humid air positioned in the solar collector 301 between the intake orifice 304 and the boiler 310 causes the warm humid air to flow from the solar collector 301 upwards to the boiler 310 thereby inducing a flow of the warm humid air to the boiler 310.

The boiler 310 is also positioned at an elevation which is lower than the elevation of the exhaust orifice 330 of the rising conduit 301.

The cooled humid air which is cooled by the boiler 310 and positioned between the boiler 310 and the exhaust orifice 330 has a higher temperature and a higher humidity and therefore a lower density than the density of the ambient air outside the rising conduit 305, thereby causing the cooled humid air to flow from the boiler 310 upwards to the exhaust orifice 330. Because the intake orifice 329 of the rising conduit 305 is connected to the solar collector 301 the upwards flow in the rising conduit 305 further causes the humid warm air to flow to the boiler 310.

While the above descriptions contain many specificities, these should not be construed as limitations on the scope of the invention, but rather as an exemplification of the preferred embodiments thereof. Many other variations are possible, for example, systems in which the boiler is positioned at an elevation above that of the solar collector, and air is recirculated between the solar collector and the boiler as a result of the low density of the rising warm air moving towards the boiler in relation to the higher density of the descending cooled air moving away from the boiler, or systems where the solar collector is positioned in a pit which has been excavated below the body of cooling water, or systems where the solar collector covers a body of water. Accordingly, the scope of the invention should be determined not by the embodiments illustrated, but by the appended claims and their legal equivalents.

We claim:

1. A method of geographically positioned, environmental solar humidification energy conversion comprising the steps of:
   (a) providing air in a solar collector;
   (b) providing water in the solar collector;
   (c) combining the provided air with the provided water in the solar collector to create humid air;
   (d) heating the provided air, the provided water and/or the humid air by the solar collector to create warm humid air;
   (e) transporting the warm humid air to a boiler of a closed cycle power system;
   (f) providing a working fluid in the boiler of the power system;
   (g) heating the working fluid in the boiler with the transported warm humid air whereby the working fluid is pressurized and the warm humid air is cooled, whereby some water vapor condenses;
   (h) converting the energy of the pressurized working fluid by passing the fluid through a turbine to produce a useful form of energy, thereby expanding the working fluid;
   (i) transporting the expanded working fluid to a condenser of the closed cycle power system;
   (j) introducing waste water from an environment body of water;
   (k) transporting the waste water to the condenser of the power system;
   (l) cooling the transported expanded working fluid in the condenser with the transported waste water, whereby the working fluid condenses, thereby heating the waste water;
   (m) recycling the cooled working fluid to provide said working fluid in the boiler of the power system;
   wherein step (b) comprises the step of:
   (1) distributing the provided water through a network of conduits to an array of emitters and
   wherein step (c) comprises the steps of:
   (1) emitting the distributed water by the emitters whereby the emitted water travels down some absorbent filaments, where each filament is suspended in the air from the emitter to which it is connected
   (2) absorbing the emitted water by the filaments
   (3) evaporating the absorbed water from the filaments.

2. A method of geographically positioned, environmental solar humidification energy conversion comprising the steps of:
   (a) providing air in a solar collector;
   (b) providing water in the solar collector;
   (c) combining the provided air with the provided water in the solar collector to create humid air;
   (d) heating the provided air, the provided water and/or the humid air by the solar collector to create warm humid air;
   (e) transporting the warm humid air to a boiler of a closed cycle power system;
   (f) providing a working fluid in the boiler of the power system;
   (g) heating the working fluid in the boiler with the transported warm humid air whereby the working fluid is pressurized and the warm humid air is cooled, whereby some water vapor condenses;
   (h) converting the energy of the pressurized working fluid by passing the fluid through a turbine to produce a useful form of energy, thereby expanding the working fluid;
   (i) transporting the expanded working fluid to a condenser of the closed cycle power system;
   (j) introducing waste water from an environmental body of water;
   (k) transporting the waste water to the condenser of the power system;
   (l) cooling the transported expanded working fluid in the condenser with the transported waste water, whereby the working fluid condenses, thereby heating the waste water;
   (m) recycling the cooled working fluid to provide said working fluid in the boiler of the power system;
   wherein step (c) comprises the steps of:
   (1) absorbing the provided water by an array of absorbent filaments, so that the filaments behave like absorbent wicks
   (2) evaporating the absorbed water from the filaments.

3. A method of geographically positioned, environmental solar humidification energy conversion comprising the steps of:
   (a) providing air in a solar collector;
   (b) providing water in the solar collector;
   (c) combining the provided air with the provided water in the solar collector to create humid air;
   (d) heating the provided air, the provided water and/or the humid air by the solar collector to create warm humid air;
   (e) transporting the warm humid air to a boiler of a closed cycle power system;
   (f) providing a working fluid in the boiler of the power system;
   (g) heating the working fluid in the boiler with the transported warm humid air whereby the working fluid is pressurized and the warm humid air is cooled, whereby some water vapor condenses;
   (h) converting the energy of the pressurized working fluid by passing the fluid through a turbine to produce a useful form of energy, thereby expanding the working fluid;
   (i) transporting the expanded working fluid to a condenser of the closed cycle power system;
   (j) introducing waste water from an environmental body of water;
   (k) transporting the waste water to the condenser of the power system;
   (l) cooling the transported expanded working fluid in the condenser with the transported waste water, whereby the working fluid condenses, thereby heating the waste water;
   (m) recycling the colled working fluid to provide said working fluid in the boiler of the power system;
   (n) recycling the cooled humid air into the solar collector to provide said air in the solar collector.

4. A method of geographically positioned, environmental solar humidification energy conversion comprising the steps of:
   (a) providing air in a solar collector;
   (b) providing water in the solar collector;
   (c) combining the provided air with the provided water in the solar collector to create humid air;

(d) heating the provided air, the provided water and/or the humid air by the solar collector to create warm humid air;

(e) transporting the warm humid air to a boiler of a closed cycle power system;

(f) providing a working fluid in the boiler of the power system;

(g) heating the working fluid in the boiler with the transported warm humid air whereby the working fluid is pressurized and the warm humid air is cooled, whereby some water vapor condenses;

(h) converting the energy of the pressurized working fluid by passing the fluid through a turbine to produce a useful form of energy, thereby expanding the working fluid;

(i) transporting the expanded working fluid to a condenser of the closed cycle power system;

(j) introducing waste water from an environmental body of water;

(k) transporting the waste water to the condenser of the power system;

(l) cooling the transported expanded working fluid in the condenser with the transported waste water, whereby the working fluid condenses, thereby heating the waste water;

(m) recycling the cooled working fluid to provide said working fluid in the boiler of the power system;

comprising the additional step of:

(n) collecting the condensed water vapor which is warm fresh water.

5. A method according to claim 4 comprising the step of:

(a) recycling the collected warm fresh water into the solar collector to provide at least a part of said water in the solar collector.

6. A method of geographically positioned, environmental solar humidification energy conversion comprising the steps of:

(a) providing air in a solar collector;

(b) providing water in the solar collector;

(c) combining the provided air with the provided water in the solar collector to create humid air;

(d) heating the provided air, the provided water and/or the humid air by the solar collector to create warm humid air;

(e) transporting the warm humid air to a boiler of a closed cycle power system;

(f) providing a working fluid in the boiler of the power system;

(g) heating the working fluid in the boiler with the transported warm humid air whereby the working fluid is pressurized and the warm humid air is cooled, whereby some water vapor condenses;

(h) converting the energy of the pressurized working fluid by passing the fluid through a turbine to produce a useful form of energy, thereby expanding the working fluid;

(i) transporting the expanded working fluid to a condenser of the closed cycle power system;

(j) introducing waste water from an environmental body of water;

(k) transporting the waste water to the condenser of the power system;

(l) cooling the transported expanded working fluid in the condenser with the transported waste water, whereby the working fluid condenses, thereby heating the waste water;

(m) recycling the cooled working fluid to provide said working fluid in the boiler of the power system;

wherein step (c) comprises the step of:

(1) combining the provided water with a surfactant, in order to increase the evaporation of the water to create more humid air.

7. A method of geographically positioned, environmental solar humidification energy conversion comprising the steps of:

(a) providing air in a solar collector;

(b) providing water in the solar collector;

(c) combining the provided air with the provided water in the solar collector to create humid air;

(d) heating the provided air, the provided water and/or the humid air by the solar collector to create warm humid air;

(e) transporting the warm humid air to a boiler of a closed cycle power system;

(f) providing a working fluid in the boiler of the power system; warm humid air whereby the working fluid is pressurized and the warm humid air is cooled, whereby some water vapor condenses;

(h) converting the energy of the pressurized working fluid by passing the fluid through a turbine to produce a useful form of energy, thereby expanding the working fluid;

(i) transporting the expanded working fluid to a condenser of the closed cycle power system;

(j) introducing waste water from an environmental body of water;

(k) transporting the waste water to the condenser of the power system;

(l) cooling the transported expanded working fluid in the condenser with the transported waste water, whereby the working fluid condenses, thereby heating the waste water;

(m) recycling the cooled working fluid to provide said working fluid in the boiler of the power system;

wherein step (c) comprises the step of:

(1) combining the provided water with a dye, in order to increase the evaporation of the water to create more humid air.

8. A method according to claim 3 wherein step (e) comprises the step of:

(1) inducing a flow of the warm humid air to the boiler by utilizing a high volume, low pressure differential, gas pump, whereby the warm humid air is transported from the solar collector to the boiler.

9. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

wherein the providing means comprises:

a network of conduits for distributing the provided water to an array of emitters, and wherein the combining means comprises:

emitters for emitting the distributed water whereby the emitted water travels down some absorbent filaments, where each filament is connected to an emitter, and where each filament is suspended in the air from the emitter to which it is connected;

filaments for absorbing the emitted water and evaporating the absorbed water.

10. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

wherein the providing means comprises:

an array of absorbent filaments for absorbing the provided water so that the filaments behave like wicks and for evaporating the absorbed water.

11. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

wherein the providing means comprises:

means for recycling the cooled humid air into the solar collector to provide said air in the solar collector.

12. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

means for collecting the condensed water vapor which is warm fresh water.

13. A system according to claim 12 wherein the water providing means comprises:

means for recycling the collected warm fresh water into the solar collector to provide at least a part of said water in the solar collector.

14. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

wherein the combining means comprises:

means for combining the provided water with a surfactant, in order to increase the evaporation of the water to create more humid air.

15. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system;

a power system for containing a working fluid;

a boiler for heating the working fluid with the transported warm humid air whereby the working fluid is pressurized and the warm humid air is cooled, whereby some water vapor condenses;

a turbine to pass the fluid through for converting the energy of the pressurized working fluid to produce a useful form of energy, thereby expanding the working fluid;

means for transporting the expanded working fluid to a condenser of the closed cycle power system;

means for introducing waste water from an environmental body of water;

means for transporting the waste water to the condenser of the power system;

a condenser for cooling the transported expanded working fluid with the transported waste water, whereby the working fluid condenses, thereby heating the waste water;

means for recycling the cooled working fluid to provide said working fluid in the power system;

wherein the combining means comprises:

means for combining the provided water with a dye, in order to increase the evaporation of the water to create more humid air.

16. A system according to claim 11, wherein the air transporting means comprises:

a low pressure differential gas pump for inducing a flow of the warm humid air to the boiler whereby the warm humid air is transported from the solar collector to the boiler.

* * * * *